United States Patent [19]
Turbak et al.

[11] 3,753,740
[45] Aug. 21, 1973

[54] EASILY PEELABLE SAUSAGE CASING

[75] Inventors: Albin F. Turbak; Henry J. Rose, both of Danville, Ill.

[73] Assignee: Tee-Pak, Inc., Chicago, Ill.

[22] Filed: Dec. 23, 1969

[21] Appl. No.: 887,722

[52] U.S. Cl.............. 99/176, 99/171 CA, 117/144
[51] Int. Cl........................................A22c 13/00
[58] Field of Search...............................99/176, 99/171 CA; 117/144

[56] References Cited
UNITED STATES PATENTS

| | | | |
|---|---|---|---|
| 3,222,192 | 12/1965 | Arnold................................. | 99/176 |
| 3,451,827 | 6/1969 | Bridgeford........................... | 99/176 |
| 2,709,138 | 5/1955 | Weingand............................ | 99/176 |
| 3,174,066 | 9/1964 | Brown.............................. | 117/144 X |
| 3,224,885 | 12/1965 | Shiner.................................. | 99/176 |
| 3,090,207 | 7/1963 | Cohen.............................. | 117/144 |
| 3,262,789 | 7/1966 | Broumand..................... | 99/171 CA |
| 3,282,905 | 11/1966 | Fasick............................ | 117/144 X |

*Primary Examiner*—Frank W. Lutter
*Assistant Examiner*—Robert Halper
*Attorney*—Neal J. Mosely and David V. Munnis

[57] ABSTRACT

Sausages, such as frankfurters and bolognas, formed in synthetic casings are more easily peeled by soaking the casings or coating the inner surface, either at the time of manufacture or after stuffing with sausage emulsion, with water-soluble or water-dispersible high molecular weight film forming or substantive carbonyl or sulfonyl containing derivatives of a fluorocarbon. The soluble fluorocarbon derivative is preferably a fluoro or perfluoro ester, amide, ketene, isocyanate, etc. The fluorocarbon derivative is preferably applied to frankfurter sausage casing in the form of a solution or dispersion at the time of manufacture just prior to drying the casing. Fluorocarbon solution or dispersion may also be applied to the soak water for larger casings of the type used for bolognas or may be applied internally to coat such casings at the time of preparation. The use of casings soaked or impregnated with these water-soluble or water-dispersible fluorocarbons facilitates removal of the casing from the smoked and/or cooked sausages at a time when untreated casings could not be peeled from the sausage.

8 Claims, No Drawings

EASILY PEELABLE SAUSAGE CASING

BACKGROUND OF THE INVENTION

1. Field of the Invention

In the preparation of sausages of various types, ranging from smaller sausages such as frankfurters and viennas up to large sausages such as bolognas, the sausage meat is normally extruded into a tubular casing for processing. In the early days of the packing industry, sausages were prepared using natural casings. About forty years ago, casings were developed of regenerated cellulose which have been used in the preparation of sausages of all sizes. Clear, thin-walled, cellulosic casings were used primarily in the preparation of frankfurters and viennas. Larger diameter, heavy-walled, cellulosic casings, both clear and fibrous reinforced, were used in the manufacture of larger sausages of the bologna type. In the manufacture of both large and small sausages, a major problem has been the stripping of the sausage casing from the sausage after it has been smoked and cooked by the meat packer. This problem has been especially great in the case of frankfurter sausages because of the large number of sausages processed.

In the preparation of frankfurters and other small sausages, a sausage paste or emulsion is extruded from a stuffing horn into a shirred sausage casing. The shirred casing will normally contain from 80 to 160 feet of casing in a shirred length of 10 to 20 in. The sausage paste or emulsion is extruded into the casing at a high speed with the result that the entire length of the casing is filled with sausage emulsion in a few seconds. As the casing is filled with sausage emulsion it passes into a linking device which twists the casing to form individual sausage links. The encased links of sausage are then cooked and smoked and are stored in a refrigerated room for about 24 hours prior to peeling. After extended storage in the chill room the encased sausages are removed into a peeling room which is maintained at a relatively high humidity. The chilled sausage has a considerable amount of moisture condensed on its surface upon removal from the chill room which facilitates removal of the casing from the individual sausages. The sausages are passed through a commercial peeling machine which cuts open the casing without cutting the encased meat and removes the casing from the sausage. Sausages which are not separated from the casing by the automatic peeling machinery must be separated by hand which adds to the cost of processing. Normally, if a particular string of sausage is difficult to peel it is returned to the chill room and cooled for an additional period of time to allow the meat emulsion to set up more thoroughly and facilitate casing removal. In the processing of frankfurters and other small sausages a major item of cost is the removal of casing from the finished sausages, particularly the cost of a high inventory in the chill room and the cost of hand peeling sausages which do not peel cleanly on the automatic peeling machinery.

2. Description of the Prior Art

The prior art has been concerned with the problem of improving the peelability of synthetic casings from sausages for many years. The attempted solutions to the problem suggested by the prior art have mainly involved the application of various coatings to the inner surface of the synthetic casings to permit the casings to be peeled more readily from the sausages. Weingand U. S. Pat. No. 2,709,138 discloses an internal release coating of a fatty isocyanate. Firth U. S. Pat. No. 3,106,471 discloses release coatings of fatty ketenes. Underwood U. S. Pat. No. 2,901,358 discloses release coatings of stearato chromic chloride chemically combined on the inner surface of the casing. Chiu U. S. Pat. No. 3,307,956 discloses release coatings of water-soluble silicones. Turbak U. S. Pat. No. 3,442,663 discloses release coating of water-insoluble polymerized silicones applied internally as a polymerized methyl hydrogen siloxane. Bridgeford U. S. Pat. No. 3,451,827 discloses release coatings of lactic acid, calcium lactate, trisodium hexametaphosphate, aluminum sulfate, potassium aluminum sulfate, lecithin diammonium phosphate, carboxymethyl cellulose, silicone oil, calcium phytate, inositol, glycerophosphoric acid, acetylated monoglycerides, methyl cellulose, or cetyl alcohol applied internally to the casing during the mechanical shirring of the casing.

The prior art, as exemplified by the aforementioend patents, has had only limited success in providing easily peelable synthetic casings for frankfurters and other small size sausages. The various coatings disclosed in the prior art are applied to the interior of large size casings, such as those used for bolognas, etc., by an internal slug coating technique. This coating technique however is not applicable to the interior coating of frankfurter type synthetic sausage casings because of the very small diameter of such casings and the speed of manufacture which makes it difficult to introduce a coating liquid inside the casing. Coating materials suce as those disclosed in U. S. Pat. No. 3,307,956 may be added from the outside of the casing in aqueous solution. However, the silicone coating materials which are water soluble or soluble in aqueous alkali are not approved coating materials for use with meat or other food products and interfere with shirring at the levels required for good peelability. Coating materials of the type disclosed in U. S. Pat. Nos. 3,442,663 and 3,451,827 may be applied to small diameter casings during mechanical shirring on a shirring machine. The application of coatings during shirring however is somewhat irregular and often results in an interior coating which is incomplete in coverage and quite variable in thickness.

SUMMARY OF THE INVENTION

This invention is based upon the discovery that artificial sausage casings, particularly casings of regenerated cellulose, both of the clear cellulose and fibrous-reinforced types, may be more easily peeled from sausages processed in the casing when thoroughly impregnated or soaked or coated on at least the inner surface with solution of dispersion of a high molecular weight water-soluble or dispersible film-forming or substantive aliphatic fluorocarbon carbonyl or sulfonyl containing derivative. The fluorocarbon compounds used are preferably esters, amides, ketenes, or isocyanates of fluorocarbons (preferably perfluorocarbon). The fluorocarbon solutions or dispersions are of a concentration providing a fluorine content in the casing of 0.0001 – 0.09 pounds per 1,000 square feet of casing. The solutions used in treating the casing are generally at a pH ranging from very mildly acidic to moderately basic, e.g. pH 5 – 10. The compounds used in treating the casing are non-toxic materials which are substantive or film-forming and thus tend to remain with the casing as a coating or impregnate after the casing has been dried and shirred and do not tend to migrate appreciably to the sausage which is eventually stuffed in the casing. The fluorocarbons which are incorporated into or coated upon the inner surface of the casing facilitate easy peeling of the casing from the sausage.

While this method of providing easy release of casing from sausages is primarily useful for frankfurter sausages it may be applied in a modified form both for frankfurter casings and large sausage casings. In applying this invention to provide easy release of larger, clear cellulose casings of fibrous casings from bolognas and the like the solution of fluorocarbon derivatives may be applied to the casing in the soak water used to soften the casing prior to stuffing with the sausage paste or emulsion or may be applied internally to coat the casing at the time of manufacture so that the inner surface contacting the sausage is thoroughly coated with the release agent.

DESCRIPTION OF THE PREFERRED EMBODIMENTS

In the manufacture of regenerated cellulose sausage casings, viscose is extruded through an annular die into a coagulating and regenerating bath to produce a tube of regenerated cellulose. The tube is subsequently washed, plasticized with glycerin, and dried while inflated under a substantial air pressure for size control. After drying, the casing is wound on reels and subsequently shirred on high speed shirring machines, such as those described in U. S. Pat. Nos. 2,010,626; 2,583,654; 2,722,714; 2,722,715; 2,723,201; etc. Reinforced cellulose casing, also known as fibrous casing, is prepared by forming a tube of a long fiber hemp paper, or the like, impregnating the paper tube with viscose, and regenerating cellulose in and on the paper tube. The viscose-impregnated tube is passed into a coagulating and regenerating bath and then subsequently washed, plasticized with glycerin and dried under air pressure. Fibrous casing is used largely for the production of large sausages such as bolognas. Large diameter clear unreinforced regenerated cellulose casing is also used in the production of large bologna type sausages. Fibrous casing and the large clear cellulosic casings are normally sold as flat stock either in the form of reel stock or cut into pieces of predetermined length.

We have found that cellulosic casings, and other synthetic sausage casings are more easily peeled from sausages processed therein if thoroughly soaked or coated on their inner surface with a solution of dispersion of a high molecular weight water soluble or water-dispersible film forming or substantive aliphatic fluorocarbon carbonyl or sulfonyl containing derivative. In the case of small diameter clear cellulosic casings of the type used in the production of frankfurter sausages, the fluorocarbon solution or dispersion is applied to the casing either in the glycerin bath or in a separate bath following the glycerin bath just prior to drying. The fluorocarbon derivative solution or dispersion may be applied internally to coat the inner surface of large diameter clear and fibrous casings prior to drying. The fluorocarbon derivative solution or dispersion may also be applied in a soak bath for sausages encased in the casings or may be applied to the soak bath for the large diameter clear and fibrous casings prior to stuffing.

In carrying out this invention any water-soluble or water dispersible non-toxic high molecular weight film forming or substantive aliphatic fluorocarbon carbony or sulfonyl containing derivatives may be used. The sulfonamide derivatives are particularly useful although esters, amides, ketenes, and isocyanates are also effective. Typical compounds which may be used include ammonium bis (N-ethyl-2-perfluoroalkyl sulfonamido ethyl) phosphates, poly-(N-methyl perfluoro octane sulfonamide ethyl acrylate), and copolymers thereof, perfluoro dodecyl ketene (in the form of the ketene dimer), perfluoro hexadecyl isocyanate (or isothiocyanate). When solutions of these compounds are applied to frankfurter type casings the solutions are usually buffered to a pH greater than about 5 to prevent acidic degradation of the casing. When solutions of these compounds are used in treating casings immediately prior to stuffing with sausages or for treating encased sausages it may be possible to use more acidic solutions (so long as the solution or dispersion remains stable). When solutions are applied internally to coat the larger casings prior to drying and reeling the higher pH is again required. In any of these cases, the solutions are of a concentration sufficient to provide a fluorine content in the casing of 0.0001 – 0.09 pounds per 1,000 sq. feet of casing. In treating small clear cellulosic casings (of the type used for frankfurters) the fluorine content of the treated casing is preferably kept in the range from about 0.0001 – 0.03 pounds per 1,000 sq. feet of casing.

In testing the efficacy of this invention casings treated as described above are stuffed with sausage emulsion or paste and formed into sausage links or chubs. The stuffed casings are cooked and/or smoked in accordance with standard commercial practices. Frankfurters are usually chilled for an extended period prior to peeling. The ease of peeling the treated casings from frankfurters encased therein is compared with the ease of peeling of untreated control casing. Likewise, the ease of peeling trated casing from larger sausages, such as bolognas, is compared with the ease of peeling of untreated control casings in preparation for slicing the large sausages for delivery to the retailer. As will be noted in the following examples, the treated casings invariably are peeled more easily than are the untreated controls.

The following non-limiting examples are illustrative of the scope of this invention:

EXAMPLE 1

A treating solution was prepared by dissolving 13 percent glycerin in water and adding 0.01 percent of a fluorocarbon ester. The fluorocarbon used in this experiment was ammonium bis (N-ethyl-2-perfluoroalkyl sulfonamido ethyl) phosphate, containing not more than 15 percent ammonium mono (N-ethyl-2-perfluoroalkyl sulfonamido ethyl) phosphate, where the alkyl group is at least 95 percent $C_8$, these compounds being water-soluble or water-dispersible and having a fluorine content of 50.2 – 52.8 percent determined on a dry solids basis.

This treating solution was substituted for the glycerin bath used to plasticize a regenerated cellulose casing in a commercial casing manufacturing machine. If desired, the bath may be added as an additional treating bath following the conventional glycerin plasticizing bath. The casing passed through the treating bath at a linear speed of at least 75 ft. per minute and had a residence time in the bath of about 20 sec. This treatment impregnates the casing with the fluorocarbon derivative at a fluorine content of about 0.0003 pounds per 1,000 sq. ft. of casing. The residence time of the casing in the bath is interdependent on the concentration of the bath. Thus, if a more dilute bath were used a longer residence time would be required and likewise a much shorter residence time can be used if the bath is used in a more concentrated form. The casing passes from the treating bath through a dryer where the casing is dried under inflation of air pressure to prevent shrinkage. The casing leaving the dryer is wound on reels and subsequently shirred on a commercial shirring machine and the shirred lengths of a size suitable for the meat packer which is to use the casing.

Some of the treated casings, together with untreated control casings, were stuffed with a commercial frankfurter paste or emulsion and processed under usual commercial processing conditions. Frankfurters are normally stuffed into shirred casing and the casing filled out from a shirred length of 10 – 20 inches to an extended length of 80 – 160 feet in the matter of a few seconds. As the casing is being stuffed, it passes through a commercial linking machine to form a string of frankfurter links. The string of links is cooked and smoked and then placed in a chill room for a period of 24 – 48 hours or longer if needed. In some other countries, the chill step is not used but the cooked and smoked sausages are allowed to stand for a period of several days before peeling. The thoroughly chilled sausages are removed from the chill room into a highly humid room where moisture condenses on the casing to facilitate casing removal. The chilled and sweated frankfurter links are then passed through a commercial peeling machine which removes the casing from the individual lengths.

As an extreme test of the efficacy of this invention, some of the controls and treated casings, stuffed with frankfurter emulsion, were removed from the chill room after about 2 1/2 hours to evaluate the peeling of the casing under these conditions. Control casing could not be peeled from the frankfurters using commercial peeling equipment and, in fact, attempts to peel the casing manually resulted in tearing meat from the surface of the frankfurters. The treated casing peeled very well from the frankfurters using standard commercial peeling machinery with less than 10 percent misses. Furthermore, the sausages missed on the peeling machines were easily peeled by hand without pulling meat away from the surface of the frankfurters.

When the frankfurters formed in the control casings and the treated casings were refrigerated for the full 24 – 48 hour period there was a substantial improvement in the performance of the untreated control casings. Nevertheless, the treated casings peeled with substantially fewer misses even under these conditions. From these experiments it was seen that the use of treated casing improved substantially the peeling performance under normal processing conditions and further limits the peeling of casing from the frankfurters after a much shorter chill period. The use of the treated casing and the preparation of frankfurters permits the meat packer a lesser inventory in the chill room and/or a substantial increase in throughput as a result of the improved peelability of casing after a short chill period.

EXAMPLE 2

A treating solution was prepared by dissolving 13 percent glycerin in water and adding 0.05 percent of the fluorocarbon derivative used in Example 1.

This treating solution was used in the treatment of commercial cellulose frankfurter casings as a substitute for the usual glycerin plasticizing bath. The casing is passed through the treating bath just prior to entering the dryer. After drying, the casing is reeled and subsequently shirred as is done with untreated control casing. The casing is impregnated with the fluorocarbon derivative at a fluorine content of about 0.0015 pounds per 1,000 sq. ft. of casing.

Shirred casing produced in accordance with this example was used together with untreated control casing in the preparation of commercial frankfurters. The processing conditions were essentially those described in Example 1. After 2 1/2 hours chilling the treated casings could be readily removed from the frankfurters using commercial fast peeling machinery while the untreated controls could not be removed. After a full 24 – 48 hours chill period the treated casings generally exhibited substantial improvement in peeling as compared to the untreated controls.

EXAMPLE 3

A solution was prepared by dissolving 13 percent glycerin in water. To this solution there was added 0.1 percent of the fluorocarbon derivative used in Example 1.

The diluted solution was used in place of the glyercin plasticizing bath in a commercial casing manufacturing apparatus. The casing passed through the bath at a speed of at least 75 ft. per minute with a residence time of about 20 sec. in the bath, just prior to entering the dryer. The casing was dried under inflation with air pressure, reeled, and shirred. The casing was impregnated with a fluorocarbon derivative to a fluorine content of 0.003 pounds per 1,000 sq. ft. of casing.

Treated casings, together with untreated control casings, were used in the preparation of commercial frankfurters substantially as described in Example 1. The treated casings peeled much more readily from the frankfurter links than did the untreated controls under the conditions described in Example 1.

EXAMPLE 4

A treating solution was prepared by dissolving 13 percent glycerin in water and adding 0.6 percent of the fluorocarbon derivative used in Example 1.

The treating solution was used in the preparation of clear cellulosic frankfurter casings substantially as described in the previous examples. The treated casings were impregnated with the fluorocarbon derivative to a fluorine content of about 0.018 pounds per 1,000 sq. ft. of casing. The treated casings produced in accordance with this example were quite difficult to shirr because of the slippery surface imparted by the fluorocarbon impregnant. However, when the shirred casings were stuffed with sausage emulsion and evaluated in accordance with the procedure described in Example 1 they were found to peel substantially better than untreated controls.

From the foregoing examples it has been found that the peelability of the casing improves with increasing concentration of the fluorocarbon derivative. However, the concentration of the fluorocarbon in the casing produced in this example represents appoximately the upper limit of practical impregnation of cellulosic casings which are to be shirred. In the case of larger casings which are not necessarily shirred in preparation for use it is possible to use higher proportions of the fluorocarbon derivatives provided that the amount used is at a completely non-toxic level. The upper level of concentration of the fluorocarbon derivative in a casing is about 0.09 pounds fluorine per 1,000 sq. ft. These higher amounts can not be used on frankfurter casings but only on the larger casings of the type used in the preparation of bolognas.

EXAMPLE 5

A treating solution is prepared by dissolving 13 percent glycerin in water and adding 0.1 percent poly-(N-methyl perfluoro octane sulfonamido ethyl acrylate).

This treating solution is used in the preparation of commercial frankfurter casings using the procedure described in Example 1. The treatment is effective to introduce the fluorocarbon derivative at a fluorine content of about 0.003 pounds per 1,000 sq. ft. of casing.

This treating solution is used in the preparation of commercial frankfurter casings in accordance with the previous examples. The treated casings are more easily removed from frankfurters than are the untreated control casings both after a short chill period and after a full 24 – 48 hour chill period, following the procedure described in Example 1.

EXAMPLE 6

A treating solution is prepared by dissolving 18 percent glycerin in water and adding about 0.1 percent perfluoro dodecyl ketene (in the form of the ketene dimer).

This treating solution is used in treating commercial frankfurter casings following the procedure described in Example 1. The treated casings are stuffed with frankfurter emulsion and processed in accordance with Example 1. The treated casings are more easily removed from frankfurters than are the untreated control casings both after a short chill period and after a full 24 – 48 hour chill period.

EXAMPLE 7

A treating solution is prepared by dissolving 18 percent glycerin in water and adding 0.1 percent perfluoro octadecyl isocyanate (the isothiocyanate can also be used).

This treating solution is used in the preparation of commercial frankfurter casings following the process described in Example 1. The fluorocarbon derivative is impregnated in the casing at a fluorine content of about 0.003 pounds per 1,000 sq. ft. of casing. The treated casings are stuffed with frankfurter emulsion and processed as described in Example 1. The treated casings are more easily removed from frankfurters than are untreated control casings both after a short chill period and after a full 24 – 48 hour chill period.

EXAMPLE 8

A casing treating solution is prepared by dissolving 15 percent glycerin in water and adding 1 percent of the fluorocarbon derivative used in Example 1. This solution is used in the internal coating of large fibrous cellulosic casings.

Large fibrous cellulosic casings are produced in accordance with processes well known in the art wherein a long fiber hemp paper is impregnated with viscose and formed into long continuous tubes and the viscose regenerated by treatment with acid. The casing is washed and plasticized with a glycerin solution and finally dried under inflation. In coating the casing an opening is made in the casing just prior to the casing entering the dryer. A large slug of the treating solution is introduced into the casing through the opening after which the opening is closed. As the casing moves past the slug of treating solution the entire inner surface of the casing is coated with the treating solution and then passes through the dryer where the casing is dried and left with an internal coating of the fluorocarbon derivative.

Casing provided with an internal coating in accordance with this example is stuffed with bologna emulsion and formed into a four foot long stick or chub of bologna sausage. The stuffed casing is clipped at opposite ends to form a short chub which is easily handled. After cooking and smoking, the casing is removed from the finished bologna sausage. The casing is easily peeled from the bologna without pulling away meat from the surface. Control casings stuffed with bologna and processed in a similar manner pull substantial amounts of meat from the surface of the sausage when the casing is removed.

EXAMPLE 9

A casing treating solution is prepared by dissolving 15 percent glycerin in water and adding 1 percent of the fluorocarbon derivative used in Example 5. This solution is used to coat the inner surface of a fibrous cellulosic casing using the procedure described in Example 8.

The treated casing is used in the processing of bologna sausages as described in Example 8 and peels more easily from the finished sausages than does an untreated control casing.

EXAMPLE 10

A casing treating solution is prepared by dissolving 15 percent glycerin in water and adding 1 percent of the fluorocarbon derivative used in Example 6. This solution is used to coat the inner surface of a fibrous cellulosic casing using the procedure described in Example 8.

The treated casing is used in the processing of bologna sausages as described in Example 8 and peels more easily from the finished sausages than does an untreated control casing.

EXAMPLE 11

A casing treating solution is prepared by dissolving 15 percent glycerin in water and adding 1 percent of the fluorocarbon derivative used in Example 7. This solution is used to coat the inner surface of a fibrous cellulosic casing using the procedure described in Example 8.

The treated casing is used in the processing of bologna sausages as described in Example 8 and peels more easily from the finished sausages than does an untreated control casing.

In the foregoing examples, the process described has been one in which the fluorocarbon derivative is added to the casing at the time of manufacture. These fluorocarbon derivatives may also be dissolved or dispersed in aqueous solutions and used in the treatment of untreated control casings stuffed with sausage emulsion, either small sausages of the frankfurter type or large sausages of the bologna type, to facilitate removal of the casing from the sausages. In the case of frankfurter production, the fluorocarbon derivatives may be applied to the casings in aqueous solution or dispersion as a soak or shower subsequent to stuffing. In the case of bologna sausages, the aqueous solution or dispersion may be applied either in the presoak of the casing or as a special soak operation after stuffing. In either case the fluorocarbon is introduced into the casing at a fluorine concentration of 0.0001 – 0.09 pounds per 1,000 sq. feet of casing.

From the foregoing examples we have found that the impregnation and coating of the inner surfaces of synthetic sausage casings with various fluorocarbon derivatives is generally effective to provide improved peeling of the casing from frankfurters and from larger sausages. While the process has been described as being applied to cellulosic casings it should be understood that the process may be used in treating any synthetic sausage casings, such as casings of collagen, alginates, starch, dextran, polyvinyl alcohol, etc. where improved peelability of the casing is desired.

We claim:

1. A process for treating an artificial sausage casing to improve the peelability of the casing from a sausage processed therein comprising impregnating said casing or coating the inner surface of said casing with an aqueous solution or dispersion of a high molecular weight non-toxic water-soluble or water-dispersible film forming or substantive aliphatic fluorocarbon carbonyl or sulfonyl containing derivative selected from the group consisting of a perfluoro ester, amide, ketene, isocyanate or isothiocyanate to provide an amount of the fluorocarbon derivative in or on the casing at a fluorine content of 0.0001 – 0.09 pounds per 1,000 sq. ft. of casing, and drying the impregnated or coated casing.

2. A process as defined in claim 1 in which the fluorocarbon derivative ammonium bis(N-ethyl-2-perfluoroalkyl sulfonamido ethyl) phosphate, poly-(N-ethyl perfluoro octane sulfonamido ethyl acrylate), perfluoro dodecyl ketene(dimer) perfluoro octadecyl isocyanate or perfluoro octadecyl isothiocyanate.

3. A process as defined in claim 1 in which said solution contains sufficient glycerin to plasticize the casing.

4. A process as defined in claim 1 in which the casing is a small frankfurter-size cellulosic casing which is impregnated with the treating solution or dispersion to impregnate the fluorocarbon derivative therein to a fluorine content of 0.0001 – 0.003 pounds per 1,000 sq. ft.

5. A process as defined in claim 1 in which the treating solution or dispersion is coated on the inner surface of the casing by introducing a slug of the solution or dispersion through an opening into the interior of the casing so that the casing passing the slug is coated uniformly on its inner surface and the coating dried thereon.

6. A process as defined in claim 5 in which the sausage casing is a fibrous cellulosic casing.

7. An artificial sausage casing produced in accordance with claim 1.

8. In the preparation of sausages by stuffing into an artificial casing the improvement which comprises adding to the casing by soak bath or shower, either before or after stuffing, an aqueous solution or dispersion of a high molecular weight non-toxic water-soluble or water-dispersible film forming or substantive aliphatic fluorocarbon carbonyl or sulfonyl containing derivative selected from the group consisting of a perfluoro ester, amide, ketene, isocyanate or isothiocyanate to introduce into the casing the fluorocarbon derivative at a fluorine content of 0.0001 – 0.09 pounds per 1,000 sq. ft. of casing, to improve the peelability of the casing from the sausage.

* * * * *